United States Patent
Sannidhanam et al.

(10) Patent No.: US 10,672,295 B2
(45) Date of Patent: Jun. 2, 2020

(54) ACCESSIBLE METADATA IN DATA STRUCTURES

(71) Applicant: Microsoft Technology Licensing, LLC, Redmond, WA (US)

(72) Inventors: Hemchander Venkateshwara Sannidhanam, Bellevue, WA (US); David Ellis Pugh, Bellevue, WA (US); Mark Alistair Wilson-Thomas, Mercer Island, WA (US); Christian David Gunderman, Bellevue, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 144 days.

(21) Appl. No.: 15/818,723

(22) Filed: Nov. 20, 2017

(65) Prior Publication Data
US 2019/0156702 A1  May 23, 2019

(51) Int. Cl.
| | |
|---|---|
| G06F 16/26 | (2019.01) |
| G09B 21/00 | (2006.01) |
| G06F 16/22 | (2019.01) |
| G06F 16/23 | (2019.01) |
| G06F 40/14 | (2020.01) |
| G06F 40/137 | (2020.01) |

(52) U.S. Cl.
CPC .......... G09B 21/006 (2013.01); G06F 16/22 (2019.01); G06F 16/2358 (2019.01); G06F 16/26 (2019.01); G06F 40/137 (2020.01); G06F 40/14 (2020.01); G09B 21/007 (2013.01)

(58) Field of Classification Search
CPC .................................. G06F 17/30; G06F 17/22
See application file for complete search history.

(56) References Cited

U.S. PATENT DOCUMENTS

| | | | | |
|---|---|---|---|---|
| 2002/0013790 | A1* | 1/2002 | Vandersluis | G06F 17/2264 715/239 |
| 2002/0016801 | A1* | 2/2002 | Reiley | G06F 16/9577 715/236 |
| 2016/0148409 | A1* | 5/2016 | Fleizach | G06F 3/0488 715/267 |

(Continued)

OTHER PUBLICATIONS

Brunsfeld, Max, "The hackable text editor", Retrieved From <<https://github.com/atom/atom>>, Retrieved on: Nov. 1, 2017, 3 Pages.

*Primary Examiner* — David E Choi
(74) *Attorney, Agent, or Firm* — Workman Nydegger

(57) ABSTRACT

Facilitating navigating presentations of data structures in a computing environment. A method includes detecting user input for navigating to a location in a presentation of a data structure stored at a computing system. The method further includes as a result of detecting user input for navigating to a location in the presentation of a data structure, outputting from an accessibility compliant interface at the computing system, at least a portion of a notification identifying the location in the presentation of a data structure. The method further includes, as a result of detecting user input for navigating to a location in the presentation of a data structure, outputting from the accessibility compliant interface at the computing system, at least a portion of an enumeration of tokens for predetermined items of import relevant to the location.

20 Claims, 3 Drawing Sheets

(56) References Cited

U.S. PATENT DOCUMENTS

2016/0196253 A1\* 7/2016 Fume ..................... G06F 3/167
  715/232
2019/0156702 A1\* 5/2019 Sannidhanam ...... G09B 21/007

\* cited by examiner

ACCESSIBLE METADATA IN DATA STRUCTURES

BACKGROUND

Background and Relevant Art

Computers and computing systems have affected nearly every aspect of modern living. Computers are generally involved in work, recreation, healthcare, transportation, entertainment, household management, etc.

Many computers are intended to be used by direct user interaction with the computer. As such, computers have input hardware and software user interfaces to facilitate user interaction. For example, a modern general purpose computer may include a keyboard, mouse, touchpad, camera, etc. for allowing a user to input data into the computer. In addition, various software user interfaces may be available.

Examples of software user interfaces include graphical user interfaces, text command line based user interface, function key or hotkey user interfaces, and the like.

It should be appreciated that there is a class of users which require enhanced accessibility features to properly interact with computing systems. For example, sight impaired users may need the computer to provide speech based input and/or output to compensate for sight impairment. Thus, for example, a user can use keyboard keystrokes (sometimes referred to as hotkeys) to navigate through a text document. As the user navigates through the text document, the computing system can narrate text in the text document where the user has navigated.

However, as can be appreciated, it is difficult for sight impaired users to navigate documents and to fully utilize editing and other tools to the same extent as fully sighted users.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that includes acts for facilitating navigating presentations of data structures in a computing environment. The method includes detecting user input for navigating to a location in a presentation of a data structure stored at a computing system. The method further includes as a result of detecting user input for navigating to a location in the presentation of a data structure, outputting from an accessibility compliant interface at the computing system, at least a portion of a notification identifying the location in the presentation of a data structure. The method further includes, as a result of detecting user input for navigating to a location in the presentation of a data structure, outputting from the accessibility compliant interface at the computing system, at least a portion of an enumeration of tokens for predetermined items of import relevant to the location.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Figure 1:
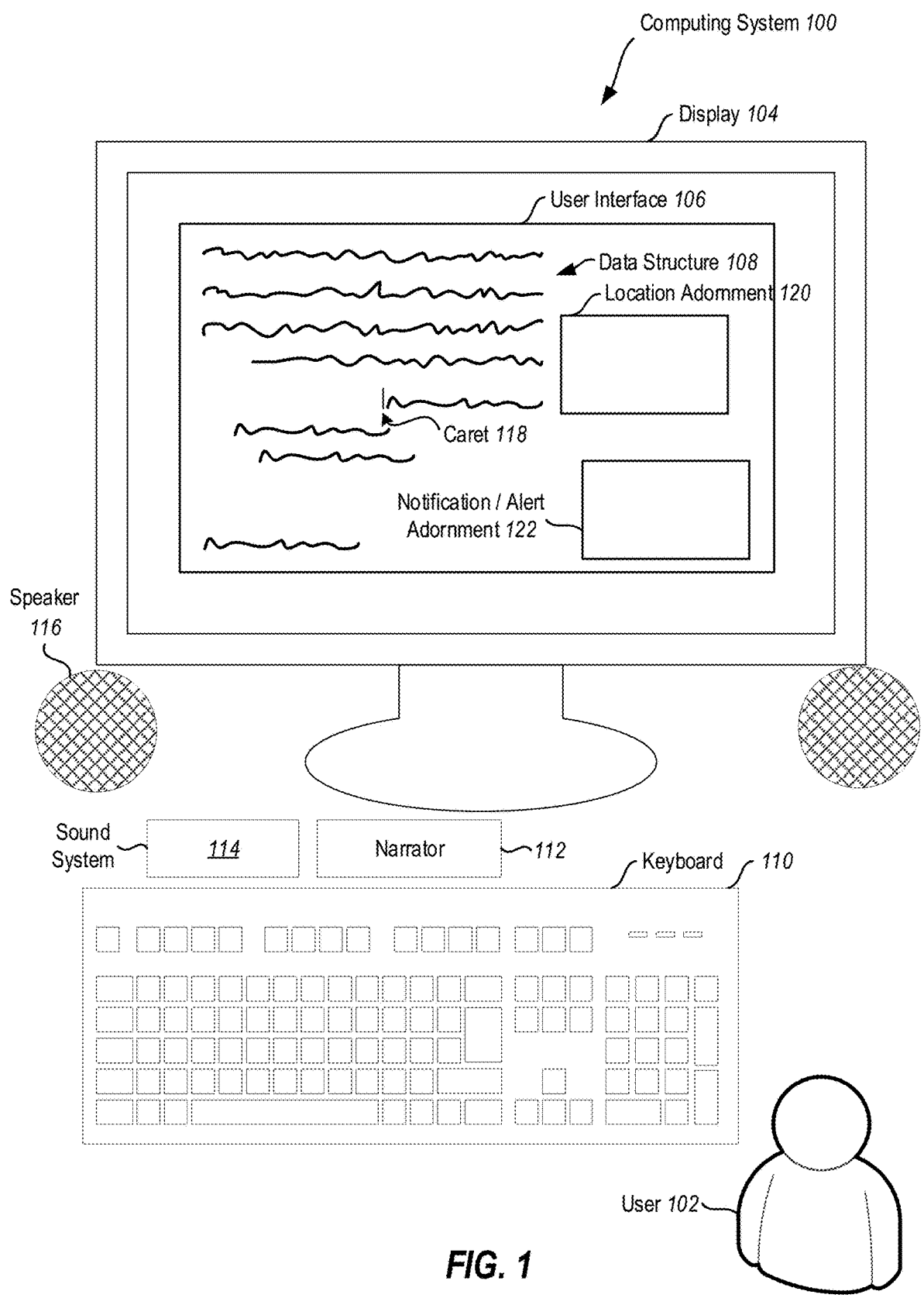
FIG. 1 illustrates a computing system interface.

Embodiments illustrated herein are directed to facilitating navigation of presentations of data structures (such as documents, code editors, databases, spreadsheets, etc.) in an accessibility centric way to enhance the user experience for users using accessibility features, such as narration. One system illustrated herein detects that a user has navigated to a particular location of a presentation of a data structure. The system, as a result of detecting that the user has navigated to the particular location of the presentation of a data structure (and optionally detecting that a user has indicated a desire to obtain location and/or information about predetermined items of import) can provide, in an accessibility compliant interface, a notification of the particular location, and at least a portion of an enumeration of predetermined items of import (e.g., metadata) relevant to the particular location. As used herein, tokens are predetermined items of import. Such tokens may describe squiggles that mark errors, warnings in code, collapsed regions of code, or other items.

Thus, for example, the system can narrate to a user a contextual indication of where in a document the user has navigated to, as well as narrate a list of tokens for the user be aware of.

In some embodiments, this metadata can be used to provide contextual information, not just navigate the document. For example, one can navigate to a token and then a narrator can read additional information to the user from the embedded metadata. One could imagine a scenario where there is a keystroke that requests additional information from the current caret position and that the information increases in verbosity with each subsequent invocation. For example, 1: "1 error"
2: "Missing ';'"
3: "Error code #: Missing ';'

4: "Error code #: Missing ';'. [brief overview of this error from docs]"

Today it is possible for users of data structure viewers and editors to hover a mouse pointer on specific tokens or group of characters to inspect additional details about them. This is the case for squiggles that mark errors/warnings in code, collapsed regions, etc.

However, previously there was no simple model to surface the same information consistently for keyboard users or other users who are limited in their ability to interact with certain computing input and output devices, such as mice, screens, etc. Therefore, embodiments illustrated herein which use keyboard shortcuts and/or navigation, or other accessibility centric navigation methods, are able to consistently surface information at any given caret position in a data structure viewer and/or editor (such as a code editor, such as Visual Studio, available from Microsoft Corporation of Redmond, Wash.). Embodiments may alternatively or additionally provide functionality for users to navigate rapidly between tokens. In some embodiments, this may be implemented in a fashion where tokens with similar attributes are grouped for navigation. For example, embodiments may group errors together, group messages together, group collapsed regions together, group suggestion together, or other groupings. As an example of one such other grouping, in some embodiments purely informational tokens which do not need user attention may be grouped together, whereas action item tokens requiring user interaction may be grouped together in a different group.

Thus, some embodiments may allow users to navigate (e.g., by using hotkey functions) through tokens according to a grouping. In alternative embodiments, the user may be able to navigate based on proximity to a caret location, priority, or some other appropriate ordering.

Text editors commonly adorn the text within them to reveal useful metadata about the text to the user. These adornments are not usually easily visible to sight impaired users of screen readers configured to narrate to the user and other assistive technologies. Thus, some embodiments illustrated herein add a general means to access, in a keyboard-friendly (or other accessibility friendly) fashion, tokens by presenting, in an accessibility compliant fashion, the tokens as adornments on the line (or other location context) the user is on, and adornments that let the user discover where they are within a presentation of a data structure, to fill this need.

This functionality can be used to implement an improved computing system for sight impaired or other assistive technology function users that allows users of such assistive technologies to discover important facts such as (but not limited to):

Does a line have a breakpoint set?
Does a line have any assistive suggestions available?
Does a line have errors/warnings/messages on it?
What code block is a line contained within?
Etc.

Further, it will allow users to navigate between items, in a user interface, of a similar nature, e.g. go to next error/warning/message/suggestion/collapsed region and more.

Indeed, improved computing systems with improved efficiency may be constructed using the principles illustrated herein. For example, in some embodiments, user interaction with the computing system can be reduced by helping impaired users to more quickly, and with more precision determine their location in a representation of a data structure. This results in the user needing to input fewer keystrokes. Keystrokes are known to be quite costly in terms of interrupts and subsequent processing to the computing system. Thus, by reducing the number of interrupts and subsequent processing, by presenting a more efficient user interface, a computing system with improved power characteristics in terms of power used and/or in terms of excess computing power available for other tasks can be implemented. Additionally or alternatively, it helps impaired users navigate and interact with an improved computing system with more awareness of the state of their work, their relative location, and less disruption to their workflow.

Referring now to FIG. 1, an example embodiment is illustrated. FIG. 1 illustrates a computing system 100. The computing system 100 is used by a user 102. The computing system 100 includes a display 104. Further, the computing system 104 includes one or more processors, video adapters, communication buses, and the like which allow the computing system 100 to display a user interface 106 on the display 104.

The user interface 106 in the illustrated example is a data structure editor configured to display data structures such as the data structure 108 and to allow the user 102 to access and/or modify the data structures displayed in the user interface 106. Note that in some embodiments, the user interface 106 may simply be a data structure navigator which does not allow user 102 to modify the data structure 108 displayed in the user interface 106, but rather simply allows the user 102 to access the data structure 108 displayed in the user interface 106.

Data structures displayed by the user interface 106 may take any one of a number of different forms. For example, the data structure 108 may be a word processing document. Alternatively or additionally, the data structure 108 may be computer executable code being developed by a developer, such as the user 102. Alternatively or additionally, the data structure 108 may be a database. Alternatively or additionally, the data structure 108 may be a spreadsheet. Alternatively or additionally, the data structure 108 may be some combination of the preceding examples. Alternatively or additionally, the data structure 108 may be some other collection of data.

The data structure 108 includes content. Content is the collection of data items included in the data structure, but is exclusive of the form of the data structure and external information about data items in the data structure. Thus, content does not include information about the organization of the data structure 108 itself. Nor does content include metadata, such as the tokens described above, which includes information about the content (such as data items in the content) and/or information about the data structure 108. Thus, information describing the location of data items in the content in the data structure 108 is not included in the content itself. Note, however that the adornments may include content, but are not themselves content. For example, as will be illustrated in more detail below, the location adornment 120 includes information from the content to identify the location. However, the adornment itself, is not content of a document. Additionally, annotations to the content, are not included in the content, as used herein.

The computer system 100 also includes a number of items to help the user 102 to interact with the presentation of a data structure 108. For example, the computer system 100 includes the display 104 which can display items to the user 102. Although as noted previously, the display may be of limited use (or indeed, virtually no use) to sight impaired users.

The computer system may include additional elements and functionality for accessibility purposes. For example, the user 102 may be able to navigate through the data structure 108 displayed in the user interface 106 using various input devices such as microphones in combination with voice command controllers, a keyboard 110, gesture-based input hardware and software, and/or other input devices. The computing system 100 includes functionality for providing output to the user 102 in an accessibility compliant interface. For example, the computing system 100 may be configured to magnify portions of the user interface 106 when the user 102 navigates to those portions using the various input devices of the computing system 100. Magnifying portions of the user interface 106 may include displaying those portions in a larger format than ordinarily displayed, with higher contrast than ordinarily displayed, combinations thereof, or in other suitable ways that facilitate modifying and displaying the portions in an accessibility compliant interface to the user 102.

Alternatively or additionally, the computing system 100 may include output devices configured to provide alternative sensory outputs that are perceptible by the user 102 using senses which are either not impaired or are less impaired. For example, the computing system 100 may include a narrator 112 that is configured to read items from the user interface 106, convert the items from the user interface 106 to spoken words, and to cause the spoken words to be provided to a sound system 114 of the computing system 100. The sound system 114 may include for example various soundcards or other adapters configured to generate audio tones, that when output to appropriate phonic hardware, are perceptible to users. Sound system 114 is coupled to phonic hardware, such as one or more speakers 116 which output the audio tones as perceptible tones perceivable by the user 102. Thus, illustrating one example, FIG. 1 illustrates that a user can navigate to a location in the user interface 106. In the example illustrated in FIG. 1, a caret 118 is illustrated which shows the location where the user 102 has navigated. The narrator 112 can read data items in the presentation of a data structure 108 near the location of the caret 118 and cause audio output to be output through the speakers 116 such that the user 102 can perceive data items around the location of the caret 118 by audio output.

As noted above, this may be suitable for allowing the user to perceive data items in the content, however the user 102 may have some difficulty in understanding the location within the presentation of a data structure 108 of the data items as well as additional tokens associated with the data items at or near the location navigated to by the user 102. Embodiments illustrated herein are able to provide additional functionality that allows the user to perceive both the location that the user 102 has navigated to by providing perceptible location adornments along with tokens about data items around the location to where the user 102 has navigated by providing other perceptible adornments, such as notification or alert adornments.

Figures 2, 3, 4:
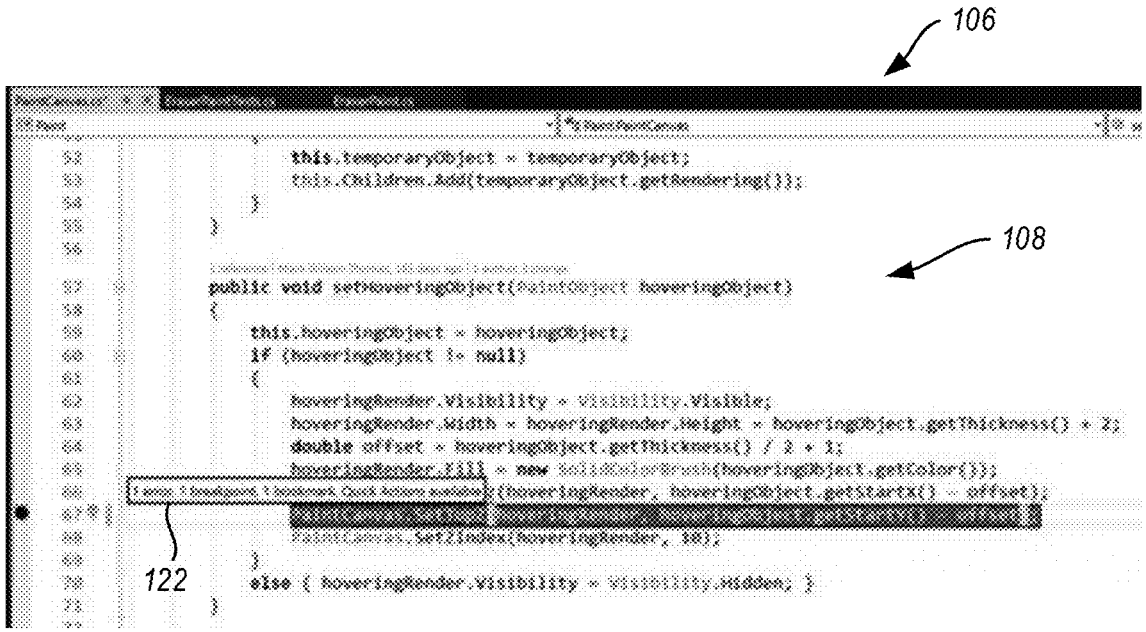
FIG. 2 illustrates an example data structure presentation.
FIG. 3 illustrates an example of a location adornment.
FIG. 4 illustrates an example of a notification/alert adornment.

Referring now to FIG. 1, an illustrative example is illustrated. In the example illustrated in FIG. 1, the user 102 navigates to the location indicated by the caret 118. As noted previously, the location of the caret 118 is a location in a presentation of a data structure 108. Reference is now made to FIG. 2, which illustrates an example presentation of a data structure 108 shown in the user interface 106. Returning once again to FIG. 1, navigating to the location indicated by the caret 118 causes at least a portion of one or more location adornments 120 and at least a portion of one or more notification/alert adornments 122 to be presented to the user 102. As noted, the location adornments 120 and notification/alert adornments 122 are presented in an accessibility compliant interface. Thus for example, in some embodiments, the location adornments 120 and notification/alert adornments 122 may be magnified for a visually impaired user. Alternatively or additionally, the narrator 112 may narrate all or portions of the data contained in the location adornments 120 and/or the notification adornment 122 causing audio output to be output through the sound system 114 and the speaker 116 to the user 102. As used herein, presenting items to a user in an accessibility compliant interface requires that the items have some type of processing performed on them to cause them to be changed from a first format that could be output to a different format that is output in a way that compensates for a user's physical impairment. Thus, in the example illustrated above, the items may be magnified to compensate for a visual impairment, narrated to compensate for a visual impairment, output to a braille output device to compensate for a visual impairment, etc. Note that the computing system 100 is selectively able to output items to the user 102 in different ways. In particular, the computing system 100 may be configured to output items to a user in a way that is accessibility noncompliant, i.e., not processed to compensate for a physical impairment. However, the computing system 100 can be configured to access accessibility noncompliant items and to modify those accessibility noncompliant items to an accessibility compliant format which is then output to the user 102. Thus, the system 100 is able to output both accessibility noncompliant items and selectively (based on user settings), accessibility compliant items based on the accessibility noncompliant items.

As discussed previously, the computing system 100 outputs at least a portion of a location adornment 120 when the user navigates to the location indicated by the caret 118. FIG. 3 illustrates an example of a location adornment 120. In this example, the location adornment 120 identifies the location according to a contextual location referring to a structure of the data structure 108. Thus for example, the location adornment 120 identifies within a code document of executable code organized according to an object oriented hierarchical structure: a namespace, a public class hierarchically below the namespace, and a function below the class. Note that while the location adornment 120 is illustrated in FIG. 3 as a text box, it should be appreciated that the location adornment may be additionally (or alternatively) presented as narrated text. Thus, as used herein, presenting an adornment does not need to be a visual presentation, but can rather be an audible presentation of the adornment (or a portion thereof) or other accessibility compliant presentation of the adornment.

Note that while FIG. 3 illustrates the summation of the presentation of the location adornment 120 over time, it should be appreciated that in some embodiments the location adornment 120 is presented over time and thus may be presented in a particular way. For example, is often useful to present the lowest hierarchical level items to a user first, prior to presenting higher level hierarchical items. Thus, the narrator 112 may be configured to narrate to the user 102 information about the function, followed by information about the class, followed by information about the namespace, followed by information about the code document. Note that the user 102 can interrupt the presentation at any time when the user has sufficient information for the user's needs. Thus, presentation of an adornment does not require that the entire adornment be presented to the user. Indeed, user input can be received selectively pausing or stopping presentation of the adornment.

A location adornment 120 may identify location in a number of different ways. As illustrated in the example above, the location adornment 120 identifies the location by a hierarchical context within a hierarchical data structure, in this case, object oriented hierarchical code. In an alternative example, location adornment 120 may identify the location by hierarchical structure within a text document. For example, the location adornment 120 may identify at least two of book, chapter, paragraph, verse, and/or other hierarchical elements. In yet another alternative example, the location adornment may identify the location by two or more of hierarchical spreadsheet book, sheet, line, row, etc. Alternatively or additionally, the location adornment 120 may identify the location by hierarchical location in a hierarchical database.

In yet another alternative embodiment, location adornment 120 may simply identify a location reference such as a line number.

As noted previously, the user navigating to the location indicated by the caret 118 (and optionally inputting a hotkey command as illustrated below) further causes at least a portion of a notification/alert adornment 122 to be presented to the user 102. The notification/alert adornment 122 is indicated by presentation of a number of tokens illustrated to the user 102 where the tokens identify items of import (i.e., items of interest) about the location indicated by the caret 118. Thus for example, as illustrated in FIG. 2, at line 67 items of particular interest or import to the user include an error, a breakpoint, a bookmark, and quick action items.

FIG. 4 illustrates a visual example of a context menu 124. The particular context menu 124 allows the user to navigate through various annotations about the location indicated by the caret 118. As noted previously, the notification/alert adornment 122 may be configured to present other tokens such as tokens related to errors, breakpoints, bookmarks, quick actions, etc. Note additionally, as will be described in more detail below, the functionality provided by the system 100 is extensible in that developers can use the basic framework, including application programming interfaces (APIs) to allow for specific tokens to be presented to a user in notification/alert adornments.

The following now illustrates specific examples of how some embodiments may be implemented.

Embodiments may be implemented which allow a user to use various interaction, such as keyboard interactions, in combination with navigation in a document (which is often also keyboard interaction based) to cause the computing system 100 to provide the various adornments. The following is a specific example of some keyboard navigation interaction and interfaces implemented in some embodiments.

Embodiments may implement functionality that allow a user 102 to essentially indicate a desire to know details about what tokens are on a line or proximate location in a presentation of a data structure which the user has navigated. Colloquially this may be expressed as: "what's near me on my line?" As used herein, showing details about what tokens are on a line or proximate a location in a presentation of a data structure to which the user has navigated may be referred to as "show details". In some embodiments, the user can indicate this desire with certain hotkey indications, such as in the present example the sequential combination of Ctrl+K, Ctrl+M.

In this example, CTRL–K, CTRL–M is designed to show the user 102 tokens near the location where the user has navigated, such as for example for the line on which they are located.

Indication of this functionality, in some embodiments will show a popup adornment (as well as presenting at least a portion of an accessibility compliant representation of the popup adornment), similar to the pop-up adornment 124 illustrated in FIG. 2 which will contain visualizations of tokens, in the following list order (note that implementation order, indicated by Px in brackets, is based on ease of getting this information by another keyboard accessible means, and does not necessarily correspond to presentation priority order which is roughly left-right visual order of display of the line for the sighted user):

(P0) presence of a quick action interface element, such as a lightbulb in Visual Studio, available from Microsoft Corporation, of Redmond Wash., for quick actions such as refactoring errors.
(P0) number of break points
(P2) Presence of a change marker covering a line
(P3) presence of a bookmark or shortcut
(P2) presence of a task
(P1) numbers of errors/messages/warnings
(P1) number of find hits, and search string found
(P1) number of selections
(P1) number of highlight references
(P2) collapsed Regions (with name if present, stating collapsed status)
(P1) code changes and history information, such as that provided by CodeLens available from Microsoft Corporation of Redmond, Wash. (where present on the inter-line above the line of code), and the summary titles from each lens in order.

Typically, sight impaired users using narrators or other accessibly compliant interfaces will use the functionality illustrated herein. However, embodiments may be implemented where hotkey indications or other commands will show a visible popup, in an accessibility noncompliant fashion for users not using accessibility compliant interface elements. This will prevent the perception by users that the command is broken for such accessibility noncompliant interface users as they discover it.

Determination of tokens for items of interest is based on where a user has navigated to in a presentation of a data structure. For example, the determination may be made based on the caret 108 location, as in the present example, this is a keyboard focused command. In some embodiments, no account is taken of the mouse cursor position or other cursor positions, such as those determined by gesture based interfaces or other similar interface. In some embodiments, items are displayed according to the presentation priority above for the text view line (as distinct from the document line).

In some embodiments, dismissal of the popup is via the Escape key, or other appropriate key, in a last-in-first-out order.

Some embodiments may include other hotkey commands, such as commands activated by CTRL–K, CTRL–I to show quick info to display the tool tip or quickinfo for whatever item the user is on (or nothing if the user is not on anything). This command also reveals readable text to readers via the appropriate attributes.

Some embodiments include functionality for lateral navigation within items of interest. For example, some embodiments may include hotkey commands, such as commands activated by CTRL–K, → & CTRL–K, ← keystrokes to enable navigation to the next/previous navigable item of interest, i.e., tokens, (e.g., errors, find results, collapsed regions, etc.) on the same line (wrapping around and remaining on the same line if needed). Navigation, in this example, is left-right or right-left from the caret respectively (depending on arrow used) regardless of the kind of item. In an alternative embodiment, F8/Shift+F8 may be used as to activate commands to navigate to the next item of interest. In some embodiments, these commands would be active only after the user has opened a "Line Information" box (and while the Line Information is still open. Note that the particular hotkey combinations illustrated herein are merely examples, and other hotkey combination, gestures, combinations thereof, etc. may additionally or alternatively be used.

Some embodiments include functionality to enable hotkey commands to present a location for a data entity. For example, some embodiments include functionality to show a structure (e.g., a hierarchical location along with hierarchical context) for a line (or other data structure entity, e.g., a data item, a paragraph, a page, or virtually any other data structure entity). Note that as used herein, presenting the structure may include narrating elements of a tooltip or presenting elements of the tooltip to a user in other accessibility compliant interfaces. In some embodiments, hotkey commands to show structure are invoked by CtrlL+K, Ctrl+G. Commands to show a structure to a user are designed to show the user the answer to the question "Where am I?" for the line (or other data structure entity) on which they are located. Note that location may be identified to the user in other appropriate ways, alternatively or additionally.

In some embodiments, invocation of commands to show a structure will show a popup containing a fully formatted structure visualizer tooltip for the relevant line (or other data structure entity), for the most nested position on that line. In some embodiments, selecting the Escape key will cause this popup to dismiss.

In some embodiments, the tooltip's accessibility metadata will contain not only the text of the structure visualizer, but also one or more of the following, in order:

P1: Line number
P0: Structure Visualizer text
   In some embodiments, in reverse order of nesting
P2: File Name
P2: Project name (if present)
P2: Solution Name (if present)

Note however, that in some embodiments, some of these items may be intentionally excluded to reduce the amount of clutter in the tooltip and/or to prevent the user from being overburdened with too much information.

In some embodiments, determination of items of interest is based solely on the caret location, as this may be a keyboard focused command. Thus, in these embodiments, no account is taken of the mouse cursor position. Items are displayed according to the presentation priority above.

Dismissal of the items of interest popup can be via the Escape key, in a last-in-first-out order.

Embodiments may include functionality to facilitate discoverability of the various commands implemented by some embodiments illustrated herein. For example, in some embodiments, for discoverability, both show location commands, such as structure commands (e.g., Ctrl+K, Ctrl+M) and show details commands (e.g., Ctrl+K, Ctrl+G) are advertised on the editor context menu, at the bottom, such as in the following example:

Show Structure (Ctrl+K, Ctrl+G)
Show Details (Ctrl+K, Ctrl+M)

In some embodiments, navigation hotkey commands, such as Ctrl+K, → and Ctrl+K, ← functions are implemented on flyouts along with shown details using hotkey commands, such as Ctrl+K, Ctrl+M, to conserve valuable context menu real estate.

Embodiments illustrated herein may be configured to be extensible. This allows 3rd party extenders of a user interface, such as a code editor to provide their own adornments and have them automatically exposed in the same manner. For example, extenders (e.g. Language Services) can declare a "region of interest" to be called out in a show details list (e.g., by invoking hotkey command by inputting Ctrl+K, Ctrl+M), along with a grouping to indicate priority of reading. Groups are (in order) (1) features that are visibly exposed as margin glyphs (e.g., items similar to a Lightbulb); (2) features that are exposed via region highlighting/underlining (e.g., items similar to selections and squiggles), and (3) features that give data about the region as a whole rather than just the line (e.g., similar to code history functionality like that included in CodeLens available from Microsoft Corporation, of Redmond, Wash.).

The following illustrates an example application programming interface (API) that can be used to extend embodiments illustrated herein. The API code is commented to explain the functionality of the various interfaces.

```
1  public interface ITip
2  {
3          /// <summary>
4          /// Dismiss the tip. Return true if the tip had been visible.
5          /// </summary>
6          bool Dismiss( );
7
8          /// <summary>
9          /// Get the current opacity of the tip (should be
100% unless explicitly set otherwise).
10         /// </summary>
11         double Opacity { get; }
12
13         /// <summary>
14         /// Set the opacity of the tip (generally to
either 100% or 10% while the control key is held down.
15         /// </summary>
16         void SetOpacity(double opacity);
17  }
18
19  public abstract class Tip : ITip
20  {
21         public abstract bool Dismiss( );
22
23         public virtual double Opacity => 1.0;
24
25         public virtual void SetOpacity(double opacity) { };
26  }
27
28  public interface ITipManager
29  {
30         bool PushTip(ITip tip);
31
32         void RemoveTip(ITip tip);
33  }
34
35  public interface ITipManagerFactory
36  {
37         ITipManager CreateTipManager(ITextView view);
38  }
```

The API for managing new line/caret metadata commands is a tagging-based API: return annotation tags:

```
39  public interface IAnnotationTag : ITag
40  {
41     /// <summary>
42     /// Can the user navigate to the location of this item (errors, find matches, collapsed regions).
43     /// </summary>
44     bool IsNavigable { get; }
45
46     /// <summary>
47     /// Some unique object where things of the same type (e.g.
```

```
tracepoints) return the same object. Used to group similar things
together.
48    /// </summary>
49    AnnotationKinds ItemKindIdentifier { get; }
50
51    /// <summary>
52    /// What should be read out to indicate the existence of <paramref
name="count"/> things of the same kind (e.g. "1 tracepoint", or "2
errors").
53    /// </summary>
54    string ItemKindDisplayText(int count);
55
56    /// <summary>
57    /// Try to show the associated tip for items of interests.
58    /// </summary>
59    /// <param name="cancel"></param>
60    bool TryShowTipAsync(CancellationToken cancel, out
Task<ITip> tipTask);
61
62    /// <summary>
63    /// What should be read out to describe this particular item (e.g.
"collapsed region: IFoo members").
64    /// </summary>
65    /// <remarks>
67    /// The screen reader will read this text of the
TryShowTipAsync call above fails.
68    /// </remarks>
69    string ItemDisplayText( );
70 }
71
72 public abstract class AnnotationTag : IAnnotationTag
73 {
74    public virtual bool IsNavigable => false;
75
76    public abstract AnnotationKinds ItemKindIdentifier { get; }
77
78    public abstract string ItemDisplayText( );
79
80    public abstract string ItemKindDisplayText(int count);
81
82    public virtual bool TryShowTipAsync(CancellationToken
cancel, out Task<ITip> tipTask)
83    {
84       tipTask = null;
85       return false;
86    }
87 }
88
89 public enum AnnotationKinds
90 {
91    Error = 0,
92    Warning = 1000,
93    Message = 2000,
94    Breakpoint = 000,
95    Tracepoint = 4000,
96    Bookmark = 5000
97 }
```

With respect to line 54 illustrated above, if two providers return the same annotation kind and return different strings for the same annotation, embodiments can randomly pick one of them to display the kind text.

The following illustrates an example hotkeys for implementing one embodiment of the invention:

In one example, a keystroke (in the Visual Studio implementation Ctrl+K,Ctrl+M) raises a popup which contains the metadata to describe the users caret-containing line's metadata. A second keystroke is configured to allow navigation through collections of said metadata. A third keystroke to show a popup for current block container description.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
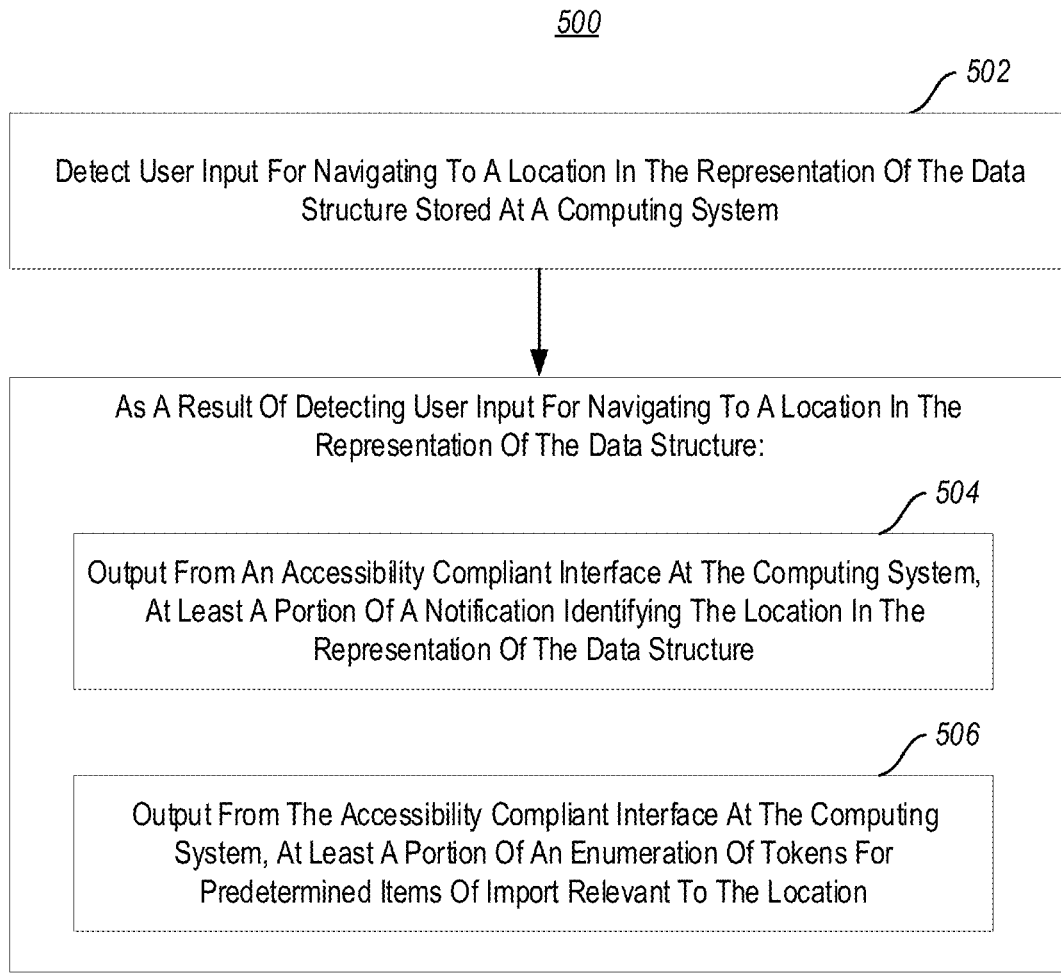
FIG. 5 is a method of facilitating navigation of a presentation of a data structure.

Referring now to FIG. 5, a method 500 is illustrated. The method 500 may be practiced in a computing environment and includes acts for facilitating navigation of a presentation of a data structure stored at a computing system. The method includes detecting user input for navigating to a location in the presentation of a data structure stored at a computing system (act 502). For example, the method may include detecting user input of keystrokes moving a caret to a location in a document, code body, database, spreadsheet, etc.

The method 500 further includes, as a result of detecting user input for navigating to a location in the presentation of a data structure outputting from an accessibility compliant interface at the computing system, at least a portion of a notification identifying the location in the presentation of a data structure (act 504). For example, the accessibility compliant interface may include a narrator, a sound system, and phonic hardware such that the method includes outputting audio notifications to the user for visually impaired users. Alternatively, the accessibility compliant interface may include a magnification of certain portion of a graphical user interface to magnify the notifications to a visually impaired user.

The method 500 further includes, as a result of detecting user input for navigating to a location in the presentation of a data structure outputting from the accessibility compliant interface at the computing system, at least a portion of an enumeration of tokens for predetermined items of import relevant to the location (act 506).

The method 500 may be performed where outputting from the accessibility compliant interface at the computing system, at least a portion of a notification identifying the location in the presentation of a data structure includes identifying a line number to a user. I.e., the system may identify a line number to which the user has navigated.

The 500 may be performed where outputting from the accessibility compliant interface at the computing system, at least a portion of a notification identifying the location in the presentation of a data structure comprises identifying a document context to a user. For example, the document context may include a hierarchical context. Thus, for example, the hierarchical context may include an object oriented context. An object oriented context may include a namespace, class, function, method, etc. Note that embodiments allow for portions of the context to be delivered over time and for the user to interrupt the delivery of context. Thus, the user may not obtain the full context including all of, for example, namespace, class, and function, but rather may only receive the portions that the user desires to receive. Also note that over time, the delivery may be in reverse order. For example, a narrator may narrate function prior to narrating class, and narrate class prior to narrating namespace. This is particularly useful for helping the user maintain a sense of location context.

In some embodiments, the hierarchical context includes a context identifying at least two of a book, chapter, paragraph, verse, and/or sentence.

Some embodiments of the method 500 further include detecting user input indicating a desire to obtain at least a portion of the enumeration of tokens for predetermined items of import relevant to the location. Thus, for example, the user may select Ctrl+K, Ctrl+M, CtrL+K, Ctrl+G, CTRL-K, CTRL-I, or combinations thereof to indicate a desire to obtain an enumeration of items of import. In some such embodiments, outputting from the accessibility compliant interface at the computing system, at least a portion of a notification identifying the location in the presentation of a data structure and outputting from the accessibility compliant interface at the computing system, a least a portion of an enumeration of tokens, is additionally provided as a result of detecting the user input indicating a desire to obtain at least a portion of the enumeration of tokens for predetermined items of import relevant to the location.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry or desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

The present invention may be embodied in other specific forms without departing from its spirit or characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A computing system comprising:
   one or more processors; and
   one or more computer-readable media having stored thereon instructions that are executable by the one or more processors to configure the computing system to facilitate navigation of a representation of a data structure stored at the computing system, including instructions that are executable to configure the computing system to perform at least the following:
   detecting user input for navigating to a location in the representation of a data structure stored at a computing system; and
   as a result of detecting user input for navigating to a location in the representation of a data structure:
   outputting from an accessibility compliant interface at the computing system, at least a portion of a notification identifying the location in the representation of a data structure, by narrating at least a portion of a notification identifying the location in the representation of a data structure; and outputting from the accessibility compliant interface at the computing system, at least a portion of adornments not included in content of the data structure but relevant to the location, such that the at least a portion of adornments, not included in the content of the data structure, are presented in an accessibility compliant fashion by narrating the at least a portion of adornments.

2. The computing system of claim 1, wherein outputting from the accessibility compliant interface at the computing system, at least a portion of a notification identifying the location in the representation of a data structure comprises identifying a line number to a user.

3. The computing system of claim 1, wherein outputting from the accessibility compliant interface at the computing system, at least a portion of a notification identifying the location in the representation of a data structure comprises identifying a document context to a user.

4. The computing system of claim 1, wherein the document context comprises a hierarchical context.

5. The computing system of claim 2, wherein the hierarchical context comprises an object oriented context.

6. The computing system of claim 2, wherein the hierarchical context comprises a context identifying at least two of a book, chapter, paragraph, verse, or sentence.

7. The computing system of claim 1, the one or more computer-readable media further having stored thereon instructions that are executable by the one or more processors to configure the computing system to detect user input indicating a desire to obtain an enumeration of at least a portion of the adornments, and wherein outputting from the accessibility compliant interface at the computing system, at least a portion of the notification identifying the location in the representation of a data structure and outputting from the accessibility compliant interface at the computing system, the at least a portion of the adornments, is additionally provided as a result of detecting user input indicating a desire to obtain the enumeration of the at least a portion of the adornments.

8. The computing system of claim 1, wherein outputting from the accessibility compliant interface at the computing system, the at least a portion of the notification identifying the location in the representation, and outputting from the accessibility compliant interface at the computing system, the at least a portion of the adornments comprises the system outputting the at least a portion of the notification and the at least a portion of the adornments to a braille output device.

9. In a computing environment, a method of facilitating navigation of a representation of a data structure stored at a computing system, the method comprising:

detecting user input for navigating to a location in the representation of a data structure stored at a computing system; and as a result of detecting user input for navigating to a location in the representation of a data structure:

outputting from an accessibility compliant interface at the computing system, at least a portion of a notification identifying the location in the representation of a data structure, by narrating at least a portion of a notification identifying the location in the representation of a data structure; and outputting from the accessibility compliant interface at the computing system, at least a portion of adornments, included in content of the data structure, but relevant to the location, such that the at least a portion of adornments, not included in the content of the data structure, are presented in an accessibility compliant fashion by narrating the at least a portion of adornments.

10. The method of claim 9, wherein outputting from the accessibility compliant interface at the computing system, at least a portion of a notification identifying the location in the representation of a data structure comprises identifying a line number to a user.

11. The method of claim 9, wherein outputting from the accessibility compliant interface at the computing system, at least a portion of a notification identifying the location in the representation of a data structure comprises identifying a document context to a user.

12. The method of claim 11, wherein the document context comprises a hierarchical context.

13. The method of claim 12, wherein the hierarchical context comprises an object oriented context.

14. The method of claim 12, wherein the hierarchical context comprises a context identifying at least two of a book, chapter, paragraph, verse, or sentence.

15. The method of claim 9, further comprising detecting user input indicating a desire to obtain at least a portion of an enumeration of at least a portion of the adornments, and wherein outputting from the accessibility compliant interface at the computing system, at least a portion of the notification identifying the location in the representation of a data structure and outputting from the accessibility compliant interface at the computing system, the at least a portion of the adornments, is additionally provided as a result of detecting user input indicating a desire to obtain the enumeration of tokens the at least a portion of the adornments.

16. The method of claim 9, wherein outputting from the accessibility compliant interface at the computing system, the at least a portion of the notification identifying the location in the representation, and outputting from the accessibility compliant interface at the computing system, the at least a portion of the adornments comprises the system magnifying the at least a portion of the notification and the at least a portion of the adornments.

17. A computing system comprising:

a user interface configured to present a data structure stored at the computing system;

wherein the user interface is further configured to detect user input for navigating to a location in the representation of a data structure stored at the computing system; and an accessibility compliant interface, wherein the accessibility compliant interface is configured to, as a result of the user interface detecting user input for navigating to a location in the representation of a data structure:

output at least a portion of a notification identifying the location in the representation of a data structure, by narrating at least a portion of a notification identifying the location in the representation of a data structure; and output at least a portion of adornments, included in content of the data structure but relevant to the location, such that the at least a portion of adornments, not included in the content of the data structure, are presented in an accessibility compliant fashion by narrating the at least a portion of adornments.

18. The computing system of claim 17, wherein the accessibility compliant interface further comprises a braille output device.

19. The computing system of claim 17, wherein the accessibility compliant interface further comprises a magnifier.

20. The computing system of claim 17, wherein the accessibility compliant interface is configured to output location by outputting a hierarchical location context.

* * * * *